(12) United States Patent
McDonald et al.

(10) Patent No.: US 7,245,559 B2
(45) Date of Patent: *Jul. 17, 2007

(54) ACOUSTIC FENCE

(75) Inventors: Larry R. McDonald, San Diego, CA (US); Gary W. Hicks, Poway, CA (US)

(73) Assignee: Science Applications Incorporated Corporation, San Diego, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 10/967,953

(22) Filed: Oct. 18, 2004

(65) Prior Publication Data

US 2006/0018198 A1    Jan. 26, 2006

Related U.S. Application Data

(63) Continuation-in-part of application No. 10/346,414, filed on Jan. 17, 2003, now Pat. No. 6,813,220.

(51) Int. Cl.
*H04B 1/06* (2006.01)
*H04B 11/00* (2006.01)

(52) U.S. Cl. .................. 367/136; 367/131; 340/541; 340/566

(58) Field of Classification Search ............ 367/131, 367/136; 340/541, 566
See application file for complete search history.

(56) References Cited

U.S. PATENT DOCUMENTS

| | | | |
|---|---|---|---|
| 3,914,729 A | 10/1975 | Sims et al. | |
| 3,922,631 A | 11/1975 | Thompson et al. | |
| 4,081,784 A | 3/1978 | Wilson et al. | |
| 4,209,776 A | 6/1980 | Frederick | |
| 4,862,427 A | 8/1989 | Almagor et al. | |
| 4,961,393 A | 10/1990 | Murray | |
| 5,138,587 A * | 8/1992 | Mason | 367/136 |
| 5,969,608 A | 10/1999 | Sojdehei et al. | |
| 6,778,469 B1 * | 8/2004 | McDonald | 367/136 |
| 6,813,220 B2 * | 11/2004 | Hicks et al. | 367/136 |
| 6,980,483 B2 * | 12/2005 | McDonald | 367/93 |
| 2003/0222778 A1 | 12/2003 | Piesinger | |

FOREIGN PATENT DOCUMENTS

| | | |
|---|---|---|
| GB | 2111679 | 7/1983 |
| WO | WO 90/01758 | 2/1990 |

\* cited by examiner

*Primary Examiner*—Ian J. Lobo
(74) *Attorney, Agent, or Firm*—Banner & Witcoff, Ltd.

(57) ABSTRACT

Methods and apparatus determine if an underwater intruder passes under a protective boundary. A sonar sensor system comprises a plurality of sonar sensor modules that are spaced on a protective boundary. A sonar sensor module comprises a sonar transducer (sonar array) that is characterized by an omni-directional radiation pattern that may overlap an omni-directional radiation pattern of an adjacent sonar sensor module transducer. The sonar sensor module collects sonar data such as range information of the target in relation to time. A central processor obtains the sonar data from each sonar module through a telemetry link. The central processor processes the sonar data from the plurality of sonar sensor modules in order to determine an estimated path of the target and may determine if the target should be considered as a threatening underwater intruder from a calculated threat level estimate based on this data.

50 Claims, 18 Drawing Sheets

ACOUSTIC FENCE

This application is a continuation-in-part of common-owned, U.S. application Ser. No. 10/346,414 filed on Jan. 17, 2003 now U.S. Pat. No. 6,813,220, naming Gary W. Hicks and Larry McDonald. The entire contents of which are incorporated herein by reference.

The U.S. Government has a paid-up license in this invention and the right in limited circumstances to require the patent owner to license others on reasonable terms as provided for by the terms of N41756-02-C-4682 awarded by the U.S. Navy.

FIELD OF THE INVENTION

The present invention relates to an acoustic barrier to protect an asset such as a ship that abuts a body of water.

BACKGROUND OF THE INVENTION

Current world events highlight the need to protect both military and civilian ships that are situated in a harbor environment. Potential threats may originate at the surface of the water or below the surface of the water. In order to protect against underwater threats, a traditional diver sonar (SOund, NAvigation and Ranging) system may employ arrays of transducer elements on a larger structure to achieve many highly directional narrow beams to cover an angular sector of ocean to detect against relevant objects, e.g. divers and swimmer delivery vehicles, while disregarding irrelevant objects, e.g. fish. A traditional diver sonar system typically looks in a horizontal direction and must have significant transmit power to provide detection in a large volume of water over a range of several hundred yards. Such sonar systems are quite expensive, typically in a price range of $500,000 to $1,000,000 and generate high power levels that may be objectionable for environmental reasons. Moreover, to adequately protect a ship in a harbor, several sonar systems may be needed, thus increasing the complexity and the cost. Because a traditional sonar system is large in size, heavy, and requires motional stability, the traditional sonar system typically lacks mobile agility and is mounted in a fixed location.

Consequently, a method and apparatus that has a reduced cost, that has mobility so that the sonar system may be transported with the ship as the ship changes locations, that can be configured for a desired perimeter typology, and that uses less power while providing a required degree of protection from underwater predators would be beneficial to advancing the art of diver sonar systems.

BRIEF SUMMARY OF THE INVENTION

The present invention provides methods and apparatus for determining if an underwater intruder passes under a protective boundary in order to protect an asset such as a ship or a power plant. With an embodiment of the invention, a sonar sensor system comprises a plurality of sonar sensor modules that are spaced on a protective boundary. A sonar sensor module comprises a sonar transducer (sonar array) that is characterized by an omni-directional radiation pattern that may overlap an omni-directional radiation pattern of an adjacent sonar sensor module. The sonar sensor module may receive sonar signals from reflections off a target that may be an underwater intruder. The sonar sensor module collects sonar data such as range information of the target in relation to time. A central processor obtains the sonar data from each sonar module through a telemetry link. The central processor processes the sonar data from the plurality of sonar sensor modules in order to determine an estimated path of the target. Furthermore, the central processor may determine if the target should be considered as an underwater intruder from a threat level estimate such as a course direction, a target motion threat score, target echo width, or a target echo amplitude.

In a variation of the embodiment of the invention, the central processor determines the estimated path by matching sonar tracking data to different simulated sonar tracking data, in which each simulated sonar tracking data corresponds to a different simulated path of the target. In another variation of the embodiment, the central processor determines an initial estimated path from geometric parameters such as range differences and time differences that are obtained from adjacent sonar sensor modules. The central processor adjusts the estimated path in order to minimize an error function.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
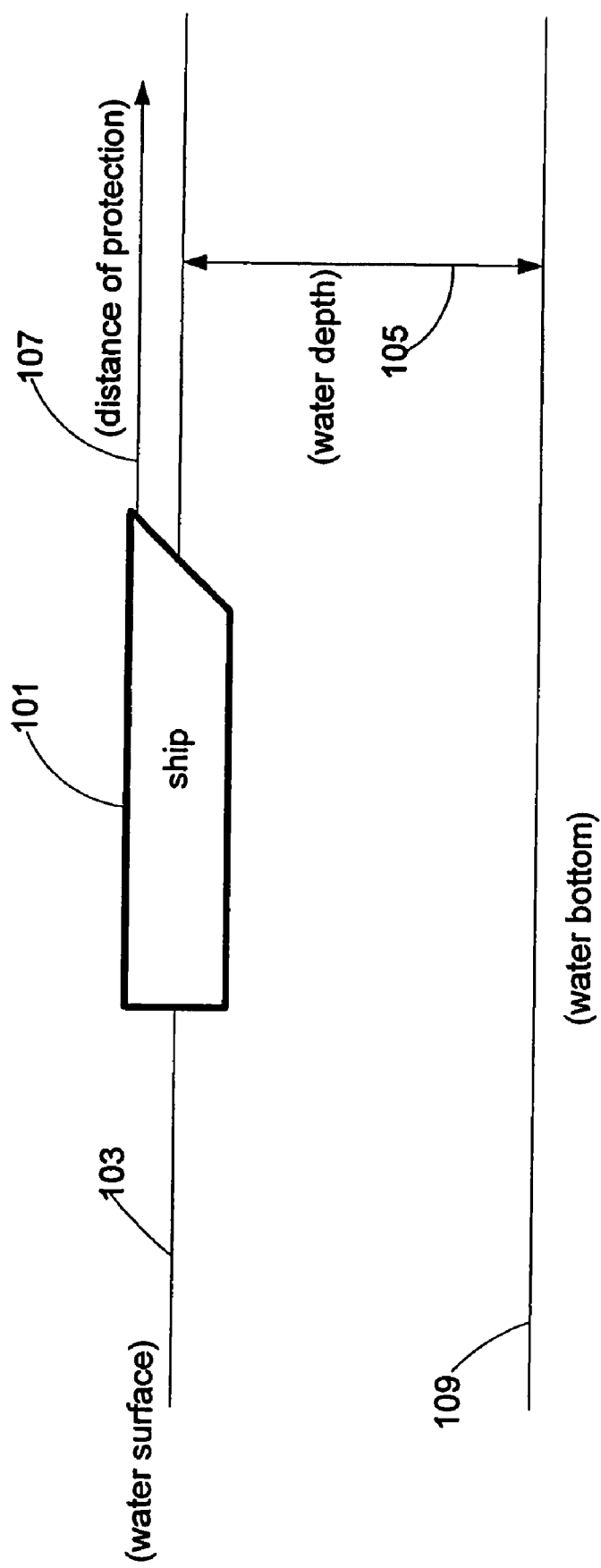
FIG. 1 illustrates a ship that is protected by a sonar system.

FIG. 1 illustrates a ship 101 that floats at a water surface 103 and that is protected by a sonar system. In FIG. 1, ship 101 is located in a harbor with a water depth 105. The sonar system protects ship 101 from intruders that pass under water (between water surface 103 and a water bottom 109) through a protection distance 107. Moreover, water depth 105 may vary in the protected region of ship 101.

Figure 2:
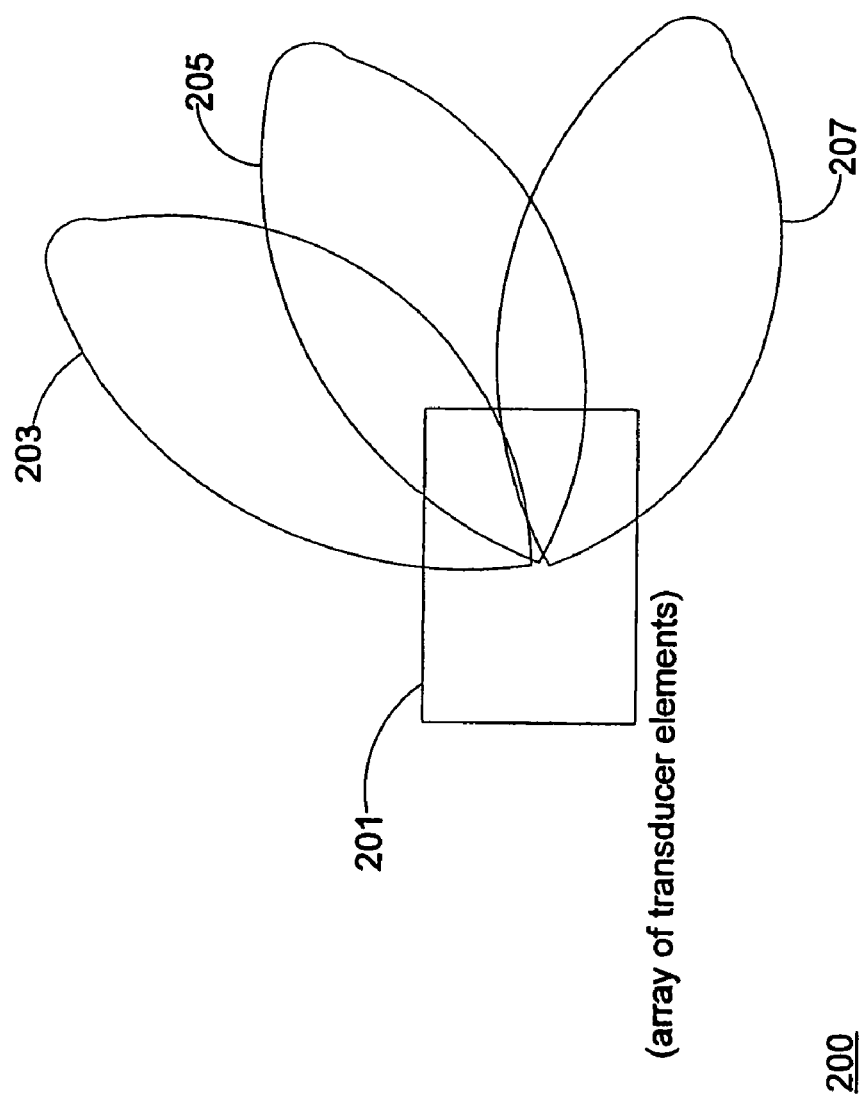
FIG. 2 shows a sonar system that protects a ship from underwater intruders in accordance with prior art.

FIG. 2 shows a sonar system 200 that protects ship 101 from underwater intruders in accordance with prior art. Sonar system 200 deploys an array of transducer elements 201 in order to form a plurality of highly directional narrow sonar radiation beams 203, 205, and 207. Sonar system 200 typically uses high transmitted power in order have a range of several hundred yards. Each sonar radiation beam (203, 205, and 207) is oriented in a horizontal direction, corresponding to an angular sector of ocean. As shown in FIG. 2, the angular sector corresponds to an approximate angle between sonar radiation beam 203 and sonar radiation beam 207. If a wider angular sector of ocean needs to be covered, additional radiation beam may be added by expanding array 201 with additional transducer elements or by adding another array (not shown). Moreover, if the vertical coverage of array 201 is not adequate to span water depth 105, additional arrays may be stacked in the vertical direction to provide the desired vertical coverage.

Figure 3:
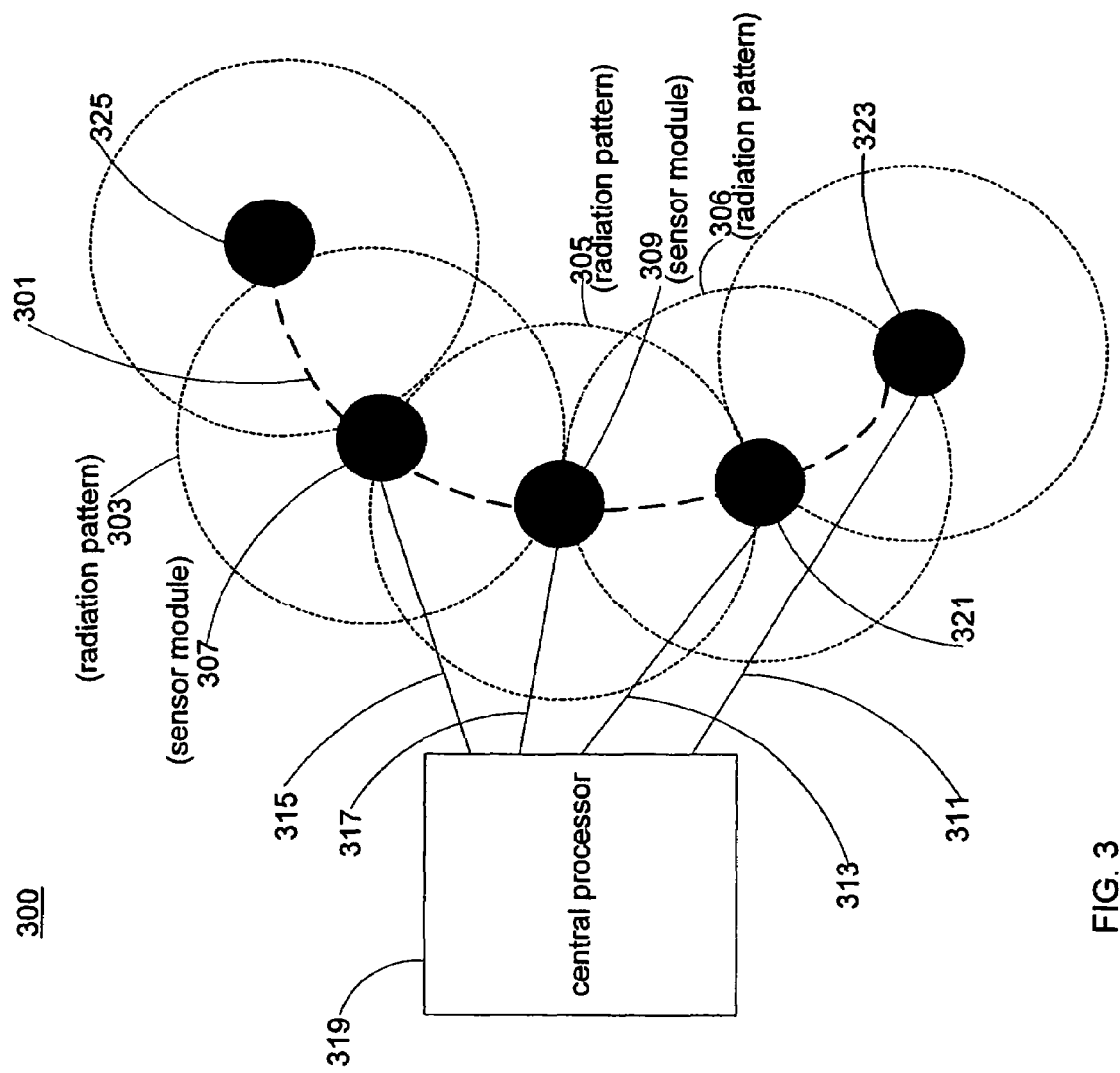
FIG. 3 shows a sonar system that protects a ship from underwater intruders in accordance with an embodiment of the invention.

FIG. 3 shows a sonar system 300 that protects ship 101 from underwater intruders in accordance with an embodiment of the invention. Sonar system 300 protects ship 101 with respect to a protective boundary 301 (e.g. a perimeter around an asset such as ship 101 or a line of protection across a harbor that is in close proximity to the asset). Although the exemplary embodiment of the invention depicts ship 101 being protected by sonar system 300, sonar system 300 may protect other types of assets that border water, either partially or completely. Exemplary assets may include power plants, bridges, oil drilling rigs, river dams, military ships, and commercial ships. Protective boundary 301, as shown in the embodiment corresponding to FIG. 3, spans across an entrance to a mooring area for ship 101 and may span protection distance 107 in order to provide the same area of coverage as sonar system 200. Although FIG. 3 depicts an arch, the embodiment may protect a protective boundary corresponding to a different shape (that may enclose an area around ship 101) by routing protective boundary 301 to correspond to the different shape.

Sonar system 300 comprises a plurality of sonar sensor modules (e.g. modules 307, 309, 321, and 323), connections 311, 313, 315, and 317, and a central processor 319. (Although not shown, other sonar sensor modules along protective boundary 301 have corresponding connections to central processor 319.) In the embodiment, connections 311, 313, 315, and 317 may be bundled together into a cable and routed along protective boundary 301 or may be arranged in a bus configuration to central processor 319. Sonar sensor modules 307, 309, 321, 323, and 325 are distributed along protective boundary 301 in an approximately uniform manner. Each sonar sensor module may correspond to a sonar radiation pattern (such as a radiation pattern 303 corresponding to sensor module 307 and a radiation pattern 305 corresponding to sensor module 309). The sonar power levels of each sonar sensor module (e.g. modules 307, 309, 321, 323, and 325) may be adjusted so that excessively strong sonar signals are not generated by each sonar sensor module beyond an associated coverage region.

A sonar module or a portion of a sonar module may be mounted on a pylon of a pier, a surface float, a leg of a water platform, a quay wall, and a water vessel.

Each radiation pattern may be non-directional with respect to underwater coverage (oriented in the downward position) and may have an approximate coverage range from 50 to 100 feet, thus requiring a reduced transmitted power. However, the distance of protective boundary 301 may be substantially greater than the coverage distance of a sensor module in order to provide a total coverage range that may be as great or greater than what is provided in prior art (e.g. with sonar system 200). In the embodiment, adjacent radiation patterns (e.g. 303 and 305) overlap at least 50% in coverage area. Adjacent sensor modules (e.g. 307 and 309) are separated by approximately the minimum expected water depth 105. However, in other embodiments of the invention, the separation between sensor modules may vary as a function of the corresponding water depth.

In the embodiment, the sensors (e.g. sensors 307, 309, 321, 323, and 325) of sonar system 300 are activated (in which a sensor generates a sonar signal that may be referred as a "ping") such that a degree of interference among the sensors is limited to a level that does not cause a false detection of a target. (For example, adjacent sensors may be activated at different times if the adjacent sensors are operating at the same frequency.) The amount of adjacent interference may be controlled by adjusting a sequence of activating each sensor and by configuring different operating frequencies with different sensors.

Figure 4:
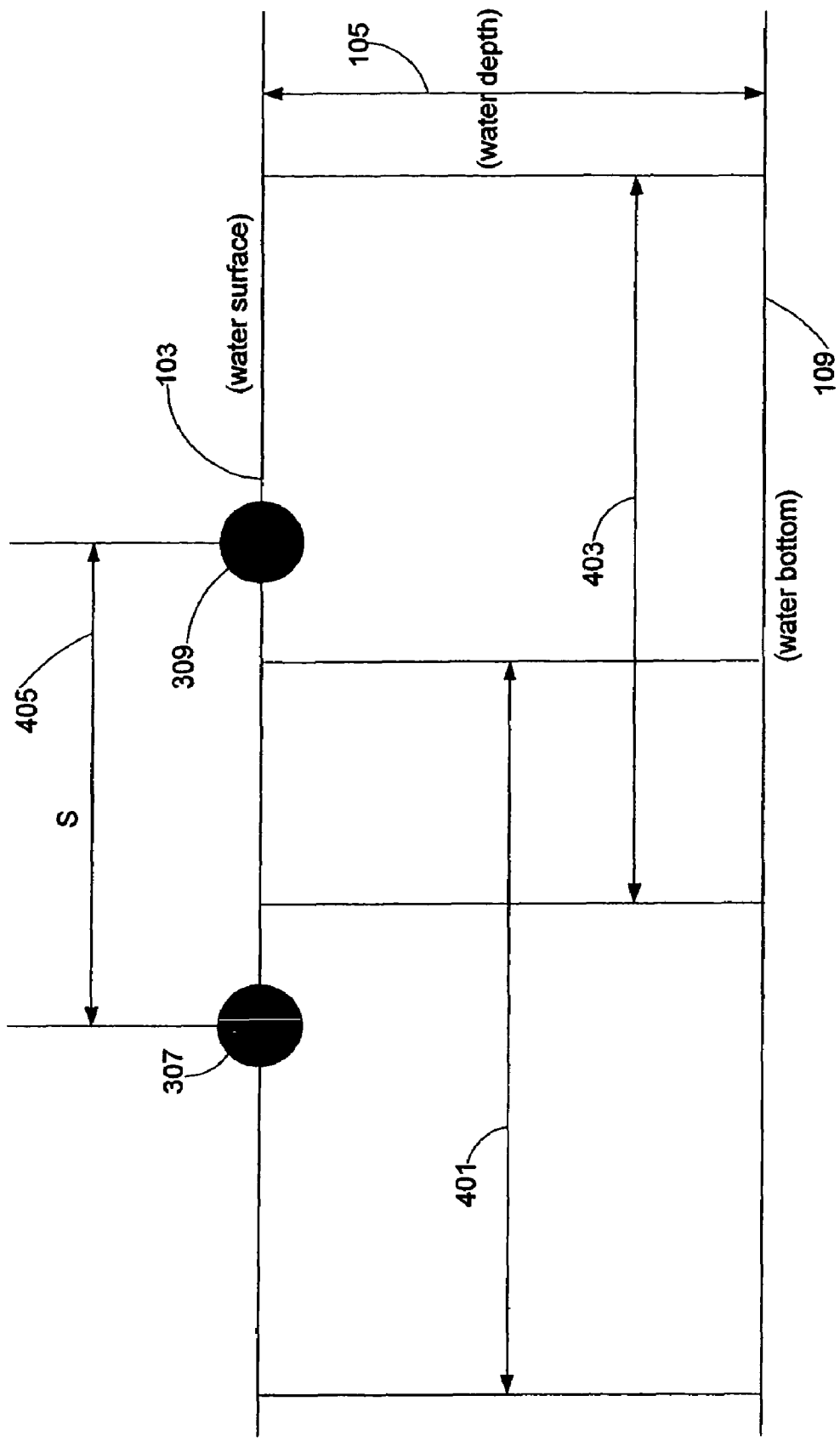
FIG. 4 shows a vertical coverage of adjacent sonar sensor modules.

FIG. 4 shows a vertical coverage of adjacent sonar sensor modules 307 and 309. FIG. 4 shows coverage regions 401 and 403 of adjacent sonar sensor modules 307 and 309, in which the distance between adjacent sensors is distance (S) 405. Sensor modules 307 and 309 are situated in the proximity of water surface 103. In an embodiment of the invention, sensor modules 307 and 309 have omni-directional coverage beams spanning coverage regions 401 and 403 (corresponding to hemispherical regions with reduced coverage in opposing hemispherical regions), respectively. In the embodiment, adjacent sonar sensor modules 307 and 309 are separated by a distance that is approximately equal to or less than water depth 105, and coverage regions 401 and 403 overlap by at least 50%. However, the embodiment may be configured for different harbor topologies in which the distance between adjacent sonar sensor modules 307 and 309 and the degree of overlap of coverage regions 401 and 403 may be adjusted. Moreover, water depth 105 may vary along protective boundary 301. In the embodiment, the distance between adjacent sonar sensor modules is approximately equal to the minimum water depth around protective boundary 301 (as shown in FIG. 3). However, in other embodiments of the invention, the distance between adjacent sonar sensors (e.g. sonar sensor modules 307 and 309) may be adjusted according to the water depth in the proximity of the adjacent sonar sensors.

Sonar sensor modules 307 or 309 comprise a sonar transducer (sonar array) that is characterized by an omni-directional radiation pattern that may overlap an omni-directional radiation pattern of an adjacent sonar sensor module. As discussed above, sonar sensor modules 307 and 309 may be situated in the proximity of water surface 103 so that a sonar array projects from top to bottom. In another embodiment of the invention, sonar sensor modules may be situated in the proximity of water bottom 109 so that a sonar array projects from bottom to top. In another embodiment of the invention, sonar sensor modules may be situated between water surface 103 and water bottom 109.

In addition to the radiation pattern projecting vertically between water surface 103 and water bottom 109, a radiation pattern of a sonar array may project sideways providing omni-directional coverage over a hemispherical region only on one side of the sonar array. A sonar transducer may be engineered so that transmission and reception is substantially attenuated on the non-radiating side (i.e., the oppositely oriented hemispherical region). For example, the sonar transducer may comprise a plurality of elements that are appropriately spaced to acoustically project in one direction and attenuate in the other direction. As another example, the sonar transducer may incorporate a baffler that absorbs acoustical energy on the non-radiating side.

Figure 5:
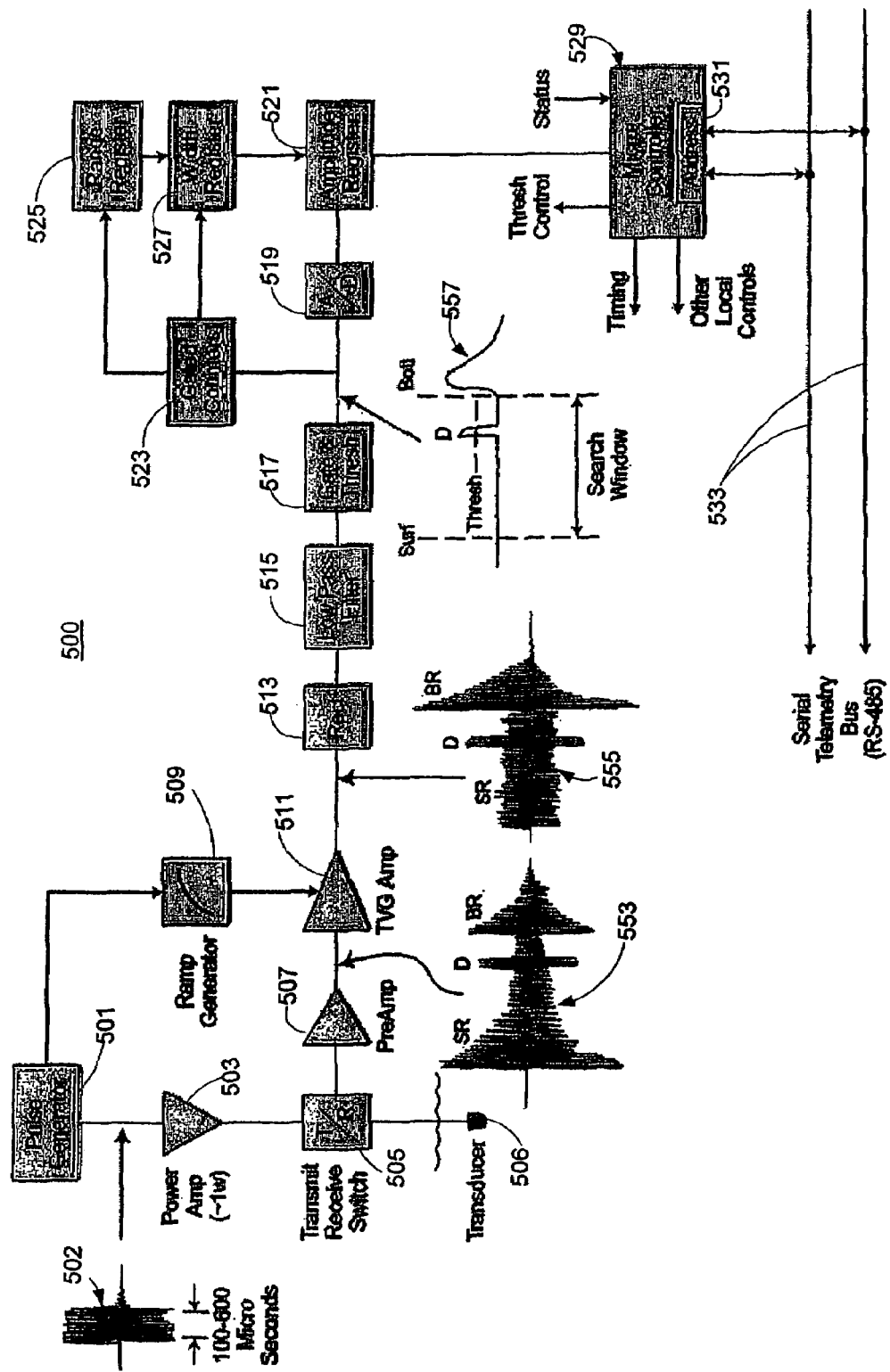
FIG. 5 shows apparatus for a sonar sensor module.

FIG. 5 shows an apparatus 500 for a sonar sensor module, e.g. sonar sensor module 307. Apparatus 500, as may be instructed by central processor 319, generates a transmitted sonar signal 502 with a pulse generator 501, a power amplifier 503, a transmit-receive (T/R) switch 505, and a transducer 506. Typically, transmitted sonar signal 502 has a time duration between 100 and 600 microseconds, with a carrier frequency between 100 KHz to 200 KHz, but other embodiments of the invention may utilize other pulse parameters.

After sonar signal 502 has been transmitted, T/R switch 505 changes its state so that apparatus 500 receives a sonar signal, resulting from reflections of transmitted sonar signal 502. The received sonar signal is received by transducer 506 (which functions in both the transmit mode and the receive mode) and is amplified by a preamplifier 507. A sonar signal 553 shows the received sonar signal at the output of preamplifier 507. Sonar signal 553 is characterized by three signal regions: a surface reverberation (SR) region corresponding to sonar reflections from water surface 103 (as shown in FIG. 1), a diver (D) region corresponding to sonar reflections from a target that may be an underwater intruder, and a bottom reverberation region (BR) corresponding to sonar reflections from water bottom 109.

A time varied gain (TVG) amplifier 511 reduces the amplitude of the SR region of sonar signal 553 by starting at a lower gain immediately after TR switch 505 reverts into the receive mode (i.e. after the transmission of transmit sonar signal 502), and by increasing its gain with time so that sonar signal 553 from surface reverberation is equalized to approximately constant amplitude until the bottom reflections begin. The resulting sonar signal is shown as a sonar signal 555. (The sonar signal during the BR-region is typically not equalized because the received sonar signal is subsequently gated off before the occurrence of the BR-region by a gate 517.) Providing at least partial amplitude equalization enhances the ability to detect a target during the D-region of sonar signal 553 by applying a threshold criteria. (Reducing the amplitude variation of sonar signal 502 also enhances the resolution of analog to digital conversion as performed by an analog to digital converter 519.)

A rectifier 513 removes the sonar carrier component of sonar signal 555 in order to obtain the corresponding envelope that is further processed by a low pass filter 515. Gate and threshold module 517 determines if sonar signal is above a threshold (which is indicative of a target) during a search window that spans betweens the initiation of sonar reception and the return of sonar reflections from water bottom 109.

In an alternate embodiment for processing the received sonar signal as previously discussed and shown in FIG. 5, the received signal from the transducer is first digitized such that the time-variable gain amplifier 511 is not required. In this embodiment, the received signals in each sensor module are rectified and filtered digitally in a microprocessor rather then use analog components 513 and 515 as shown in FIG. 5. In addition, the historical variation of amplitude of each "range cell" in the received data (a mathematical measure called Sigma) is calculated for the group of pings (up to 32 in the present implementation) immediately prior to the current ping. The result is a stored measure of what "normal" ping amplitudes versus range are when a diver is not present. The microprocessor then uses these "normal" amplitudes as thresholds to judge whether the return signal from each range cell deviates from the normal value sufficiently to determine a "detection". In this way, only echoes that are different enough from the "normal" at a given range are selected and sent to the central computer processor on shore. When a target is being detected from a given sensor, the pings containing the target echo is excluded from the historical pings used in the Sigma calculation to avoid "contamination" by the target.

From sonar signal 557, apparatus 500 determines the corresponding range and amplitude of the received sonar signal as well as the width of a detected target echo during the D-region of sonar signal 557 from a range register 525, an amplitude register 521, and a width register 527, respectively that are gated by gated counters 523. The corresponding data are collected by a microcontroller 529. Microcontroller 529 may provide this data to central processor 319 through an interface 531 and a serial telemetry bus 533. The embodiment supports the RS-485 standard, which is a differential data transmission standard that is specified by Electronic Industries Association (EIA) and Telecommunications Industry Association (TIA). Sonar data may be collected in a variety of ways, including after each transmission of sonar signal 502 or after a plurality of transmission of sonar signal 502. Data may be collected autonomously, in which a sonar sensor module (e.g. module 307) automatically sends the data, or may be collected in a polled manner, in which central processor 319 queries each sonar sensor module to return sonar data.

The embodiment may utilize different higher layer protocols with respect to the physical layer as provided by the RS-485 standard. For example, the embodiment may support an Internet Protocol (IP) in conjunction with Transmission Control Protocol (TCP). Also, other embodiments may utilize a different physical layer such as Ethernet.

After processing the received sonar signal in response to transmitting a sonar signal at a time instance, apparatus 500 may transmit a subsequent transmitted sonar signal 502 at a subsequent time instance and process a received sonar signal in order to determine a range, amplitude, and width of a target corresponding to the subsequent time instance. This process is typically repeated during the detection mode of sonar system 300.

Figure 6:
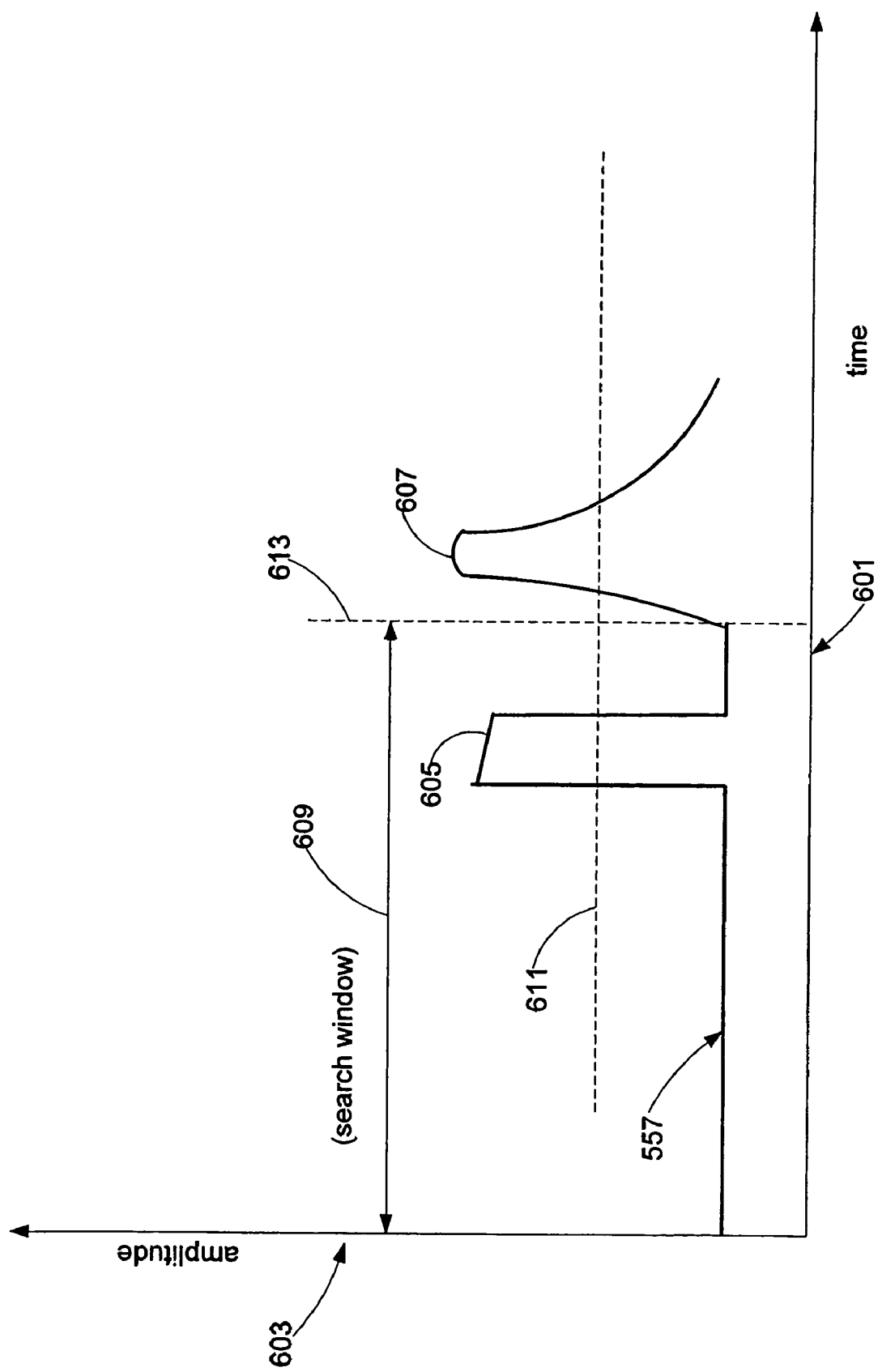
FIG. 6 shows a sonar signal that is received by a sonar sensor module.

FIG. 6 shows sonar signal 557 that is received by a sonar sensor module. Apparatus 500 determines whether amplitude 603 of sonar signal 557 during D-region 605 exceeds a threshold 611 during search window 609. Sonar signal 557 is gated off at time 613, corresponding to the beginning of BR-region 607.

Figure 7:
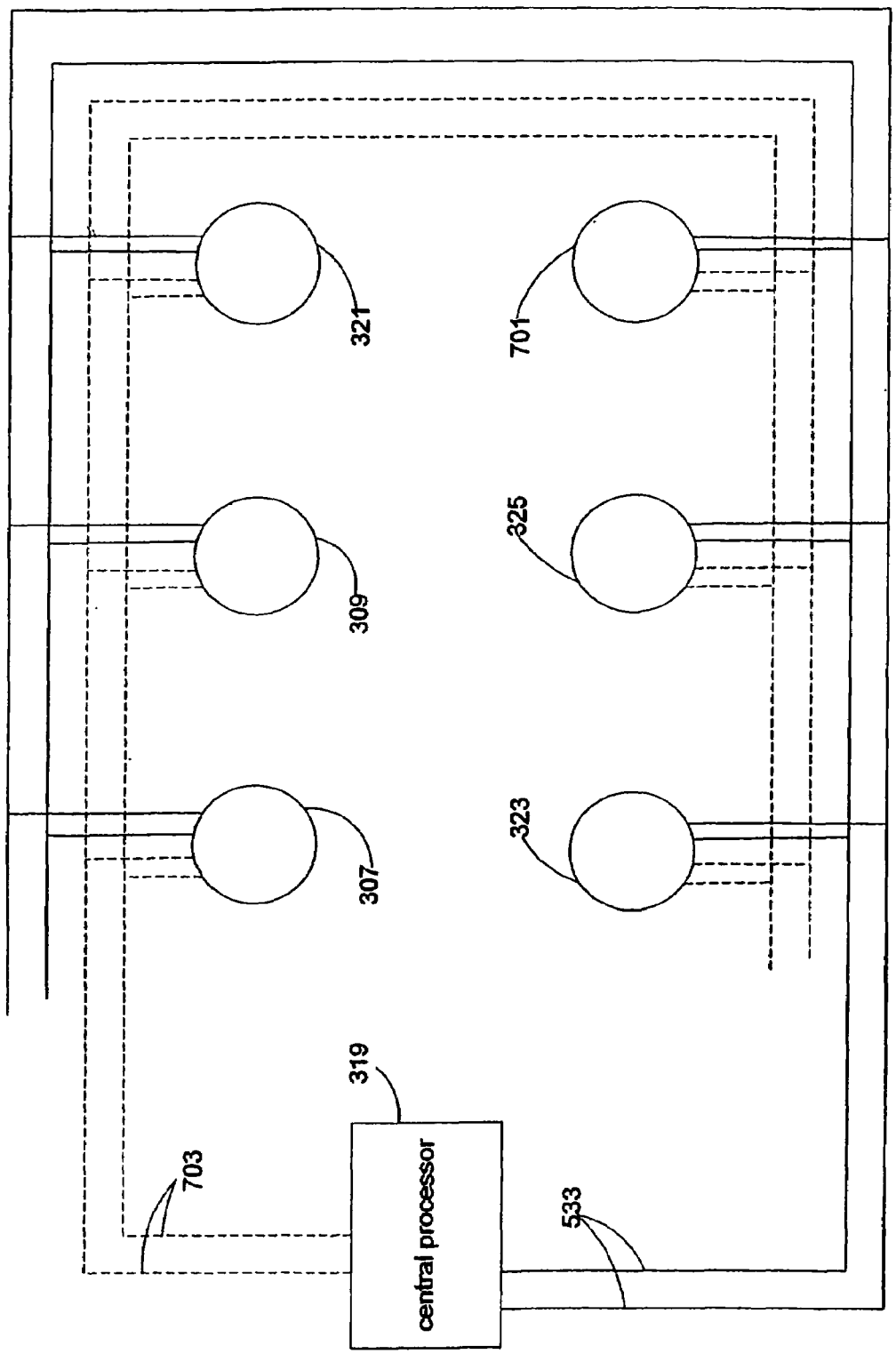
FIG. 7 shows a telemetry configuration for a sonar system.

FIG. 7 shows a telemetry configuration for a sonar system 300. Central processor 319 collects target data (e.g. range, amplitude and target width) from each of the sonar sensor modules (e.g. modules 307, 309, 321, 323, 325, and 701) through telemetry bus 533 (as shown in FIG. 5) or through a "backup" telemetry bus 703. Telemetry busses 533 and 701 support two-way communication between central processor 319 and the sonar sensor modules so that central processor 319 may send commands to the sonar sensor modules and so that the sonar sensor modules may send information about received sonar signals to central processor 319.

In an embodiment of the invention, the two telemetry busses 533 and 703 may be combined into one pair of twisted wires rather than two pairs of twisted wires as indicated in FIG. 7. This is accomplished with bi-directional RS-485 repeater circuitry in each sensor module. Each repeater circuit senses the direction of arrival of a digital data message and switches the repeater to continue sending it in the same direction. In normal operation, all messages are thereby present at both ends of the Acoustic Fence. If there is a cut in the line between sensor modules, the repeaters on each side isolate the cut and the communications from all other sensors can proceed back to the central processor along the appropriate half of the telemetry line. This feature is similar to the power line in which power is fed from both ends of the line. In the event of a cut, an isolation circuit in each section prevents the line from being shorted out by sea water. Together, these features allow the fence to be fully operational even if cut, or if sections are disconnected to provide a gate to allow the passage of a ship.

In the embodiment, telemetry bus 533 and telemetry bus 703 each may comprise a twisted pair of wires in order to reduce common mode noise that may be injected by noise sources along telemetry busses 533 and 703. Also, telemetry busses 533 and 703 may each provide electrical power for each of the sonar sensor modules or may provide electrical power through a separate pair of wires. Sonar system 300 supports two telemetry busses (bus 533 and bus 703) in order to support transmission redundancy. For example, if an intruder cuts telemetry bus 533 or 703, fuses or switches will isolate each side of the cut so that both telemetry busses 533 and 703 remain partially operational. Telemetry bus 533 may still operate the modules before the cut, while telemetry bus 703 operates modules after the cut. In the embodiment, if both telemetry busses 533 and 703 are fully operational, approximately half of the sonar sensor modules may communicate with central processor 319 through telemetry bus 533 while the other approximate half of the sonar sensor modules may communicate to central processor 319 through telemetry bus 703 in order to distribute the message traffic load.

Figure 8:
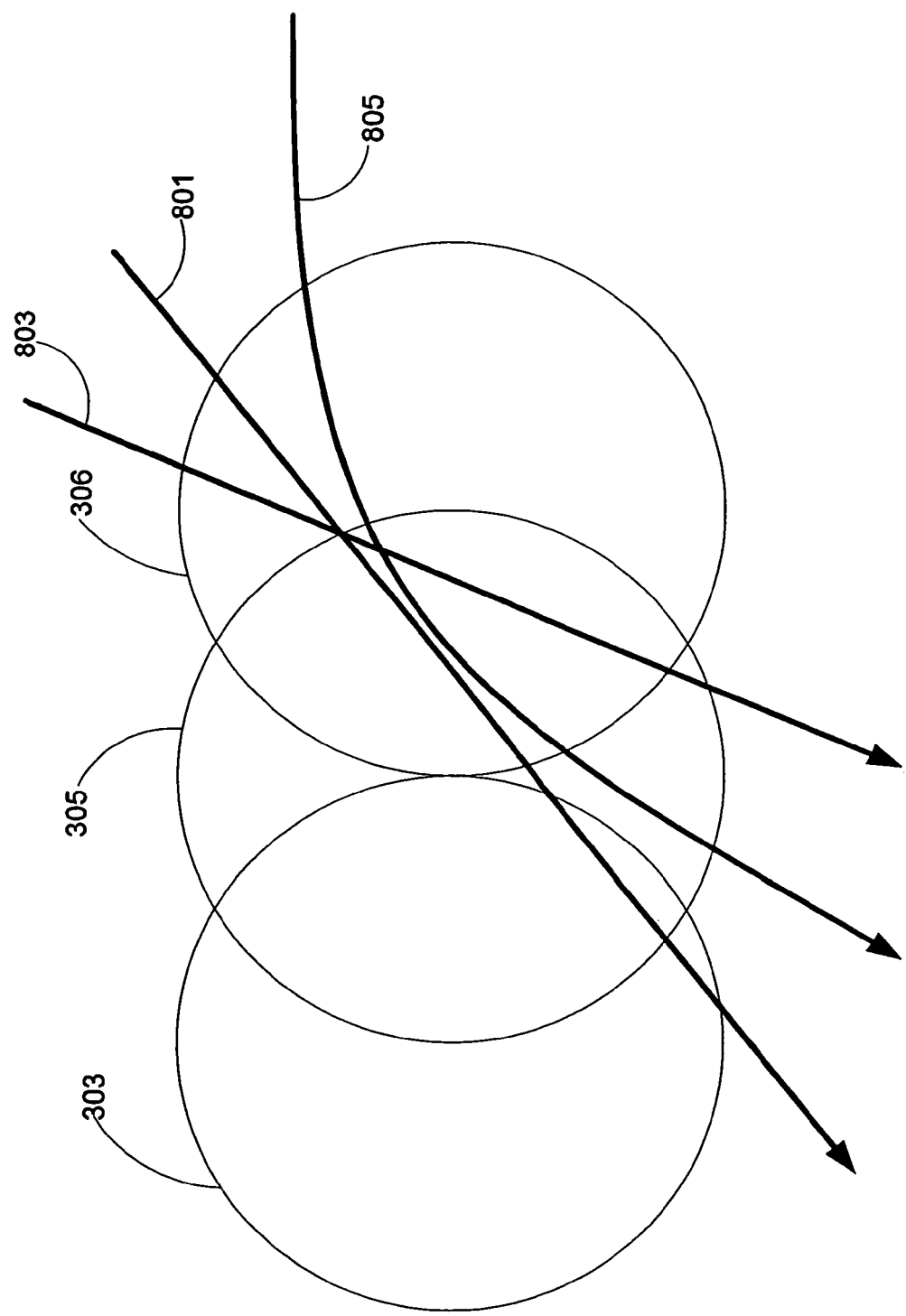
FIG. 8 shows an example of a path of an underwater intruder through a sonar system.

FIG. 8 shows an example of a path 801 of an underwater intruder traversing through sonar system 300. (In the discussion regarding FIGS. 8-11, a target is assumed to be an underwater intruder, and is referred as such. However, sonar system 300 may determine if the target should be considered to be an underwater intruder as may be performed in step 1205 in FIG. 12.) In FIG. 8, the underwater intruder traverses through coverage areas 303, 305, and 306 of sonar sensor modules 307, 309, and 321, respectively. An underwater intruder may traverse different paths, such as a path 803. With path 803, only two adjacent sonar sensor modules (i.e. modules 305 and 306) detect the intruder. Even though the example shown in FIG. 8 illustrates linear path 803, an underwater intruder may traverse a non-linear path such as path 805 or a zigzag path (not shown).

Figure 9:
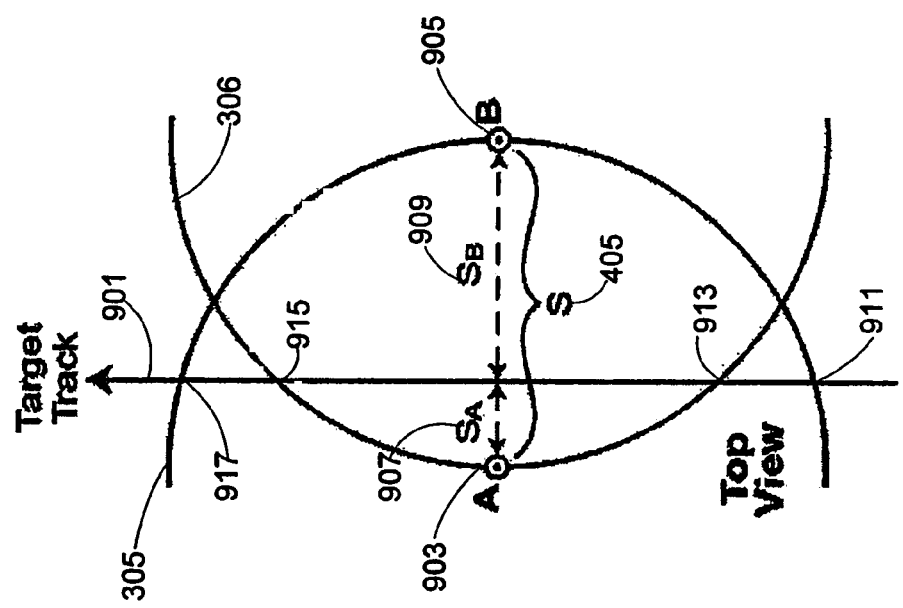
FIG. 9 shows an a path of an underwater intruder that is perpendicular to a protective boundary of a sonar system.

FIG. 9 shows a path 901 of an underwater intruder that is essentially perpendicular to protective boundary 301 of a sonar system 300. Path 901 traverses through coverage regions 305 and 306, corresponding to sonar sensor modules 309 and 321, respectively. Sonar sensor module 309 is approximately situated at a location A 903 and sonar sensor module 321 is approximately situated at a location B 905. As the underwater intruder traverses path 901, the horizontal distance to sonar sensor module 309 is horizontal distance ($S_A$) 907 and the horizontal distance to sonar sensor module 321 is horizontal distance ($S_B$) 909. The distance between sonar sensor modules 309 and 321 is distance (S) 405. In geometric configuration shown in FIG. 9, S 405 is approximately equal to $S_A$ 907 plus $S_B$ 909. In the embodiment, a sonar sensor module may detect the underwater intruder only if the intruder is within the coverage region of the sonar sensor module (e.g. within region 305 for sonar sensor module 309). Thus, sonar senor module 309 detects the intruder between points 911 and 917, and sonar sensor module 321 detects the intruder betweens points 913 and 915. Moreover, the speed of the intruder may be approximated by dividing the distance between points 911 and 917 by the time interval for the intruder to traverse between points 911 and 917. One can also perform the same calculation for points 913 and 915. (The approximation is more accurate the more constant the intruder's velocity is.)

Figure 10:
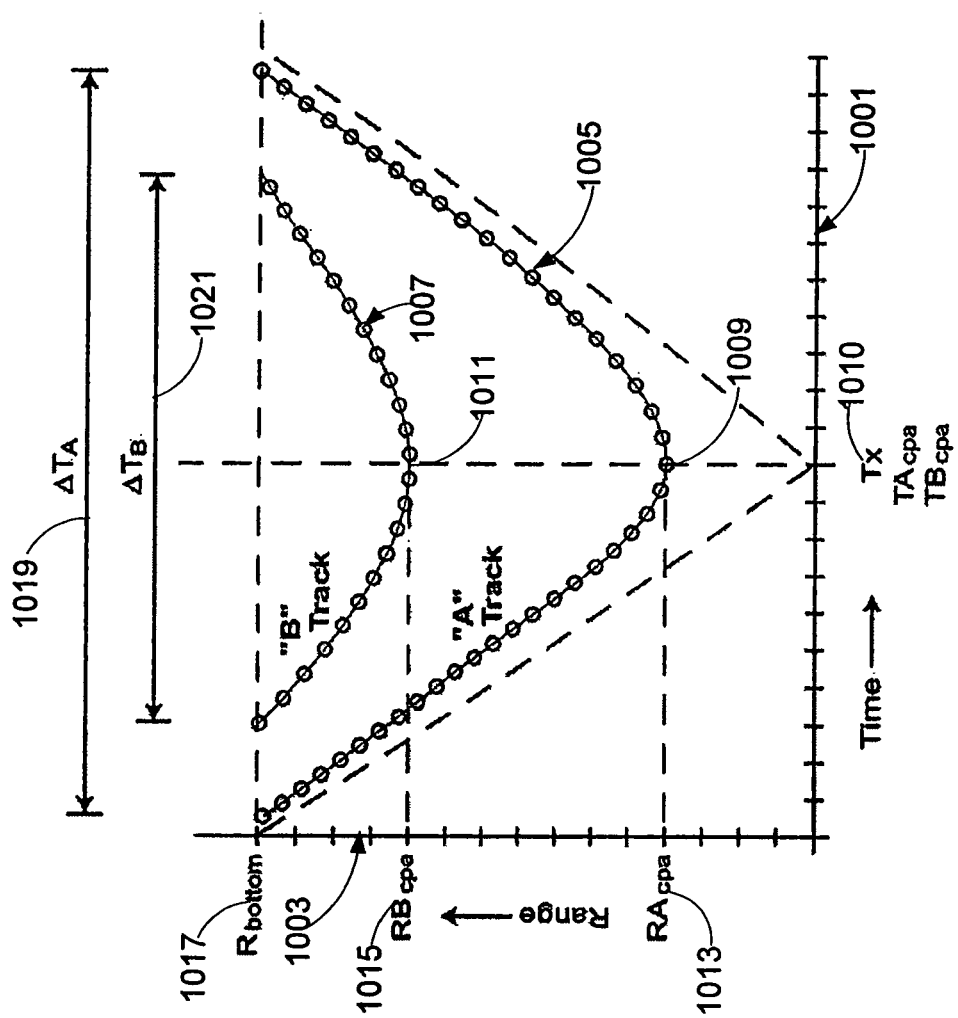
FIG. 10 shows associated tracking data of adjacent sonar sensor modules for the example shown in FIG. 9.
Figure 11:
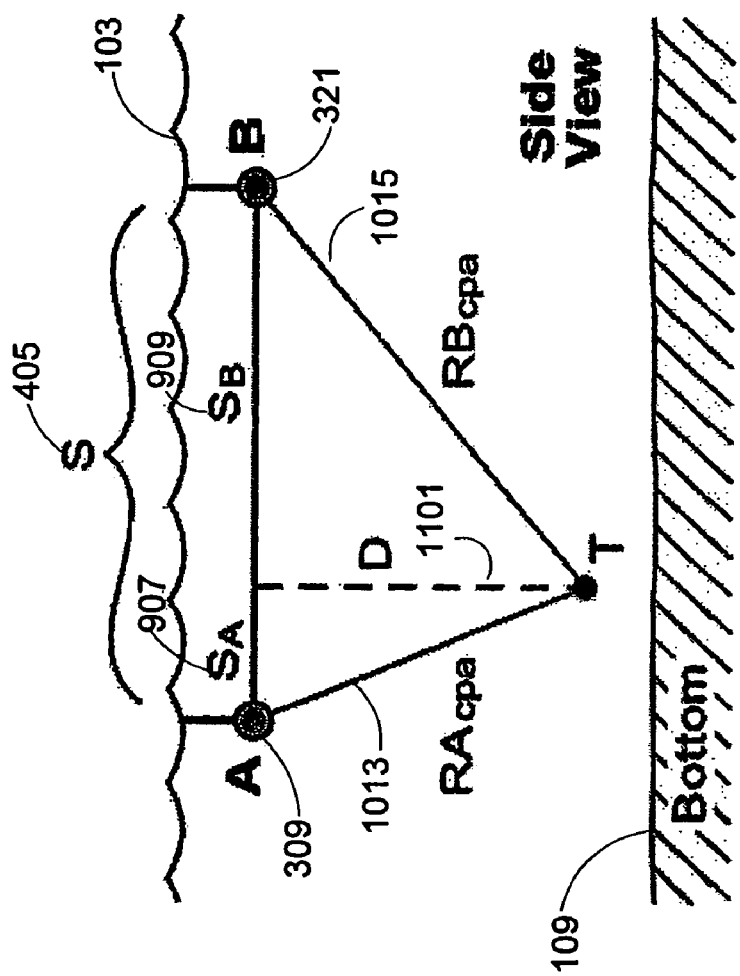
FIG. 11 shows a method of determining the depth of an underwater intruder for the example shown in FIG. 10.

FIG. 10 shows associated tracking data 1005 and 1007 obtained from adjacent sonar sensor modules 309 and 321, respectively, for the example shown in FIG. 9. Each data point on tracking data 1005 corresponds to a range measurement of a target from sonar sensor module 309 (as shown in FIG. 11) and each data point on tracking data 1007 corresponds to a range measurement of the intruder from sonar sensor module 321 (as shown in FIG. 11) as a function of time. Because the sonar coverage of a sonar sensor module is essentially omni-directional, an individual measurement from a sonar sensor module is not indicative of the direction of an intruder's path. However, central processor 319 may correlate data from a plurality of sonar sensor modules (e.g. modules 309 and 321) in order to deduce the direction of the intruder's path. In FIG. 10, a closest point of approach of the intruder (CPA) 1009 to sonar sensor module 309 has a range $R_A$ 1013 and closest point of approach of the intruder 1011 to sonar sensor module 321 has a range $R_B$ 1015 at approximately the same time $T_x$ 1010 for paths approximately perpendicular to the line between modules. The underwater intruder traverses between points 911 and 917 in a time ($\Delta T_A$) 1019 and between points 913 and 915 (as shown in FIG. 9) in a time ($\Delta T_B$) 1021.

FIG. 11 shows a method of determining a water depth 1101 of an underwater intruder for the example shown in FIGS. 9 and 10. In this example, the intruder is moving in a perpendicular direction to protective boundary 301, which corresponds to a shortest path to ship 101. In fact, from this observation, the path of the intruder may be determined. (The intruder moving in the perpendicular direction to protective boundary 301 corresponds to CPA 1009 occurring at essentially the same time as CPA 1011.) Sonar sensor module 309 is separated from sonar sensor 321 by distance S 405. Because the intruder is approaching protective boundary in the perpendicular direction, distance S 405 is essentially equal to horizontal distance $S_A$ 907 plus horizontal distance $S_B$ 909

Applying the Pythagorean theorem to a triangle corresponding to distance $S_A$ 907, range $R_A$ 1013, and water depth D 1101 and to a triangle corresponding to distance $S_B$ 909, range $R_B$ 1015, and water depth D 1101, one may determine water depth D by the following equations (other algorithms may be possible as well):

$$S_A = S(K/(K+1)) \qquad (EQ.\ 1)$$

$$S_B = S(1/(K+1)) \qquad (EQ.\ 2)$$

$$D = \sqrt{[(R_B)^2 - (S_B)^2]} \text{ or } D = \sqrt{[(R_A)^2 - (S_A)^2]} \qquad (EQ.\ 3),$$

where $K = R_A/R_B$.

Figure 12:
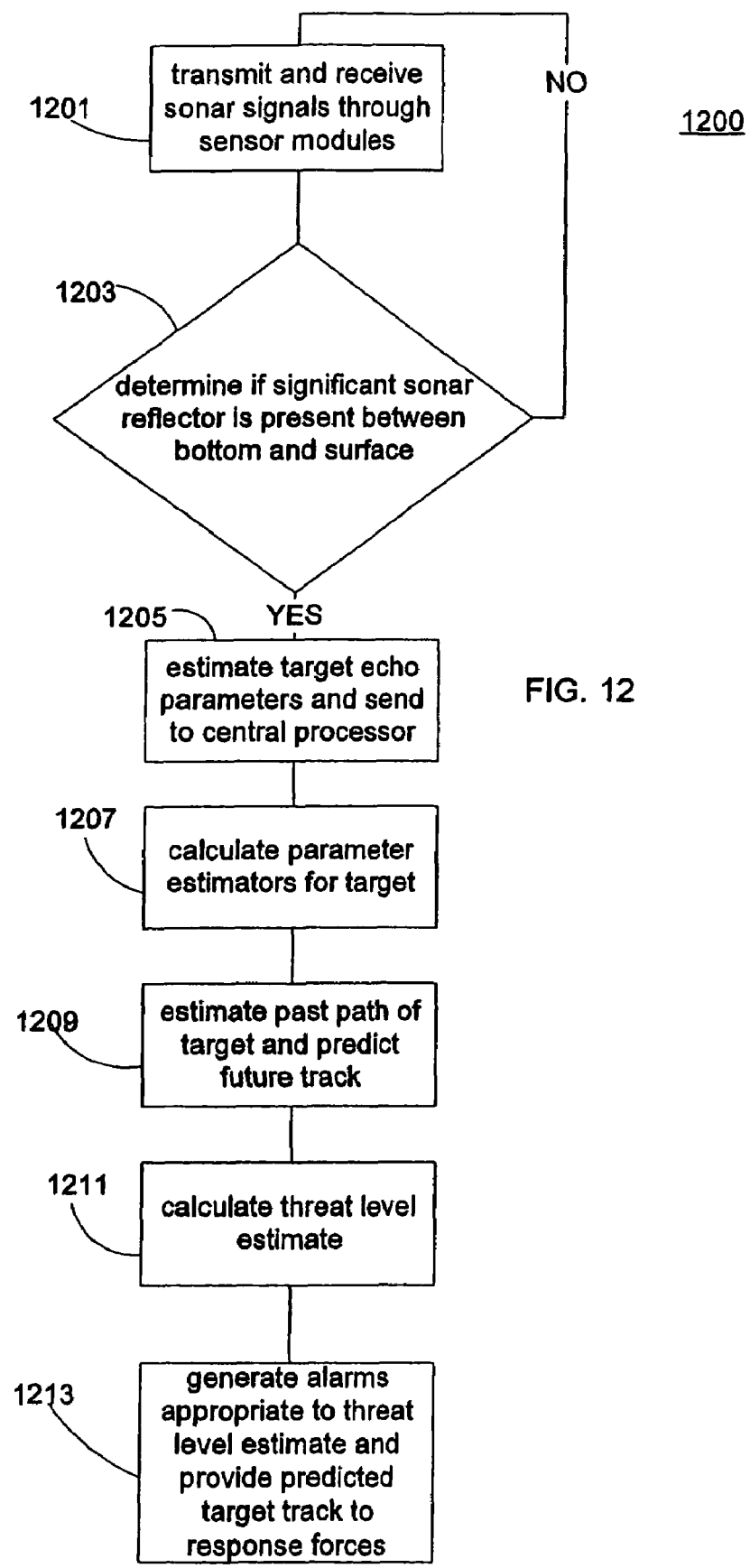
FIG. 12 shows a flow diagram for a sensor system.

FIG. 12 shows a flow diagram 1200 for sonar sensor system 300. In step 1201, (after a transmit pulse has been sent on command), sonar signals are received by a sonar sensor module (e.g module 307) from sonar reflections from the target. In step 1203, system 300 applies criteria to the signals to determine if a significant reflecting body is present between surface and bottom. If not, the system 300 waits for another command to "ping" again, in which step 1201 is repeated. If a significant echo is received, in step 1205 sonar sensor system 300 measures parameters of the received sonar echo from the potential target. In the exemplary embodiment, sonar sensor module system 300 collects tracking data (as exemplified in FIG. 13, in which measured ranges to potential targets are collected in relation to time), as well as size and amplitude data related to the echo. This data is then sent from the sonar sensor module (or modules) receiving potential target echoes to central processor 319 through telemetry busses 533 and 703.

In step 1207, central processor 319 collects and stores the recent sonar data measurements from the modules receiving echoes and uses the data to calculate at least one estimator about the target and/or the target's path (e.g. path 801 or path 803). In the embodiment, an estimator pertains to an initial guess of a parameter that is associated with the target or its path (e.g. path consistency, closest point of approach, depth, speed, size, etc). In step 1209, central processor 319 utilizes one or more estimators in order to facilitate the determining of an estimated target path. In the embodiment, as will be discussed in the context of FIGS. 13-16, central processor 319 searches a collection of simulated tracking data and attempts to match a set of simulated tracking data to the actual sonar data. This approach is similar to a technique known as matched-field tracking. In a variation of the embodiment, as will be discussed in the context of FIGS. 17 and 18, central processor 319 adjusts the estimated path in order to minimize an error measure between corresponding tracking data (i.e. corresponding to the estimated path) and actual tracking data. This approach is referred as error-function minimization, and may be used to improve the speed and efficiency of the target path estimation and prediction of future target locations over time.

In step 1211, central processor 319 processes the sonar data and path estimations in order to determine if the target echo should be perceived as an dangerous (human) underwater intruder as opposed to a marine mammal, fish, or other reflector. In the exemplary embodiment, central processor 319 develops a threat level estimate (a measure of a probability or likelihood that the target is a human underwater intruder on a relatively consistent path toward the protected asset) by comparisons with potential threat characteristics and capabilities. In the embodiment, central processor 319 may use a target motion threat score that is based upon depth, speed, and path (track) consistency; a course direction threat score that is based on an angle of crossing protective boundary 301; the amplitude of the received sonar signal reflected from the target in relation to the range of the target as compared with an expected "target strength"; a target echo width, relating to target size; and other criteria that may be derived from the sonar data. In step 1213, different levels of alarms may be initiated depending on the threat level estimate, and the predicted track of the target is calculated and can be provided to response forces.

Figure 13:
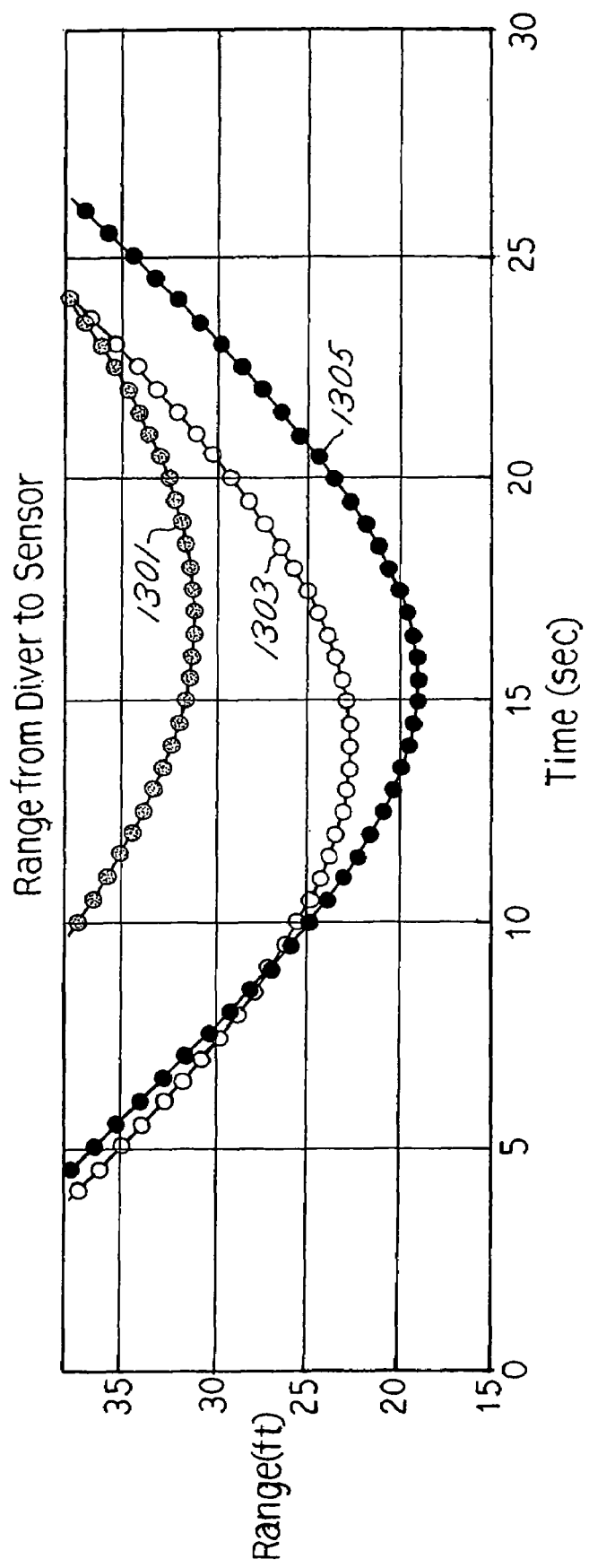
FIG. 13 shows an example of tracking data of a possible underwater intruder.

FIG. 13 shows an example of tracking data 1300 of a target. Tracking data 1300 comprises tracking data 1301, tracking data 1303, and tracking data 1305 that central processor 319 collects from adjacent sonar sensor modules, e.g. modules 307, 309, and 321, respectively.

Figure 14:
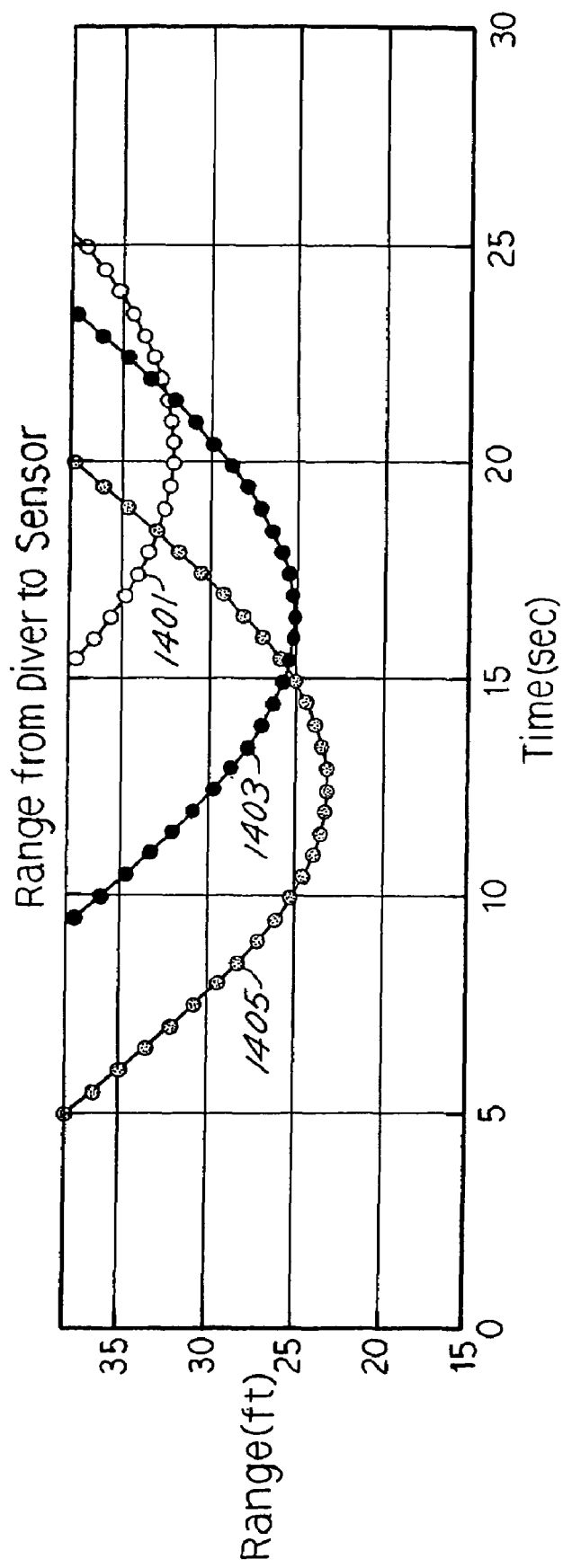
FIG. 14 shows a first example of simulated tracking data.

FIG. 14 shows a first example of simulated tracking data 1400. In an example of the embodiment, simulated tracking data 1401, 1403, and 1405 that are simulated "off-line" (i.e. previous to receiving tracking data 1300 by sonar sensor modules 307, 309, and 321) for a first path of the target. Simulated tracking data are simulated for different simulated paths, and the sets of simulated tracking data (e.g. sets 1400, 1500, and 1600) are stored in a memory that is associated with central processor 319.

Figure 15:
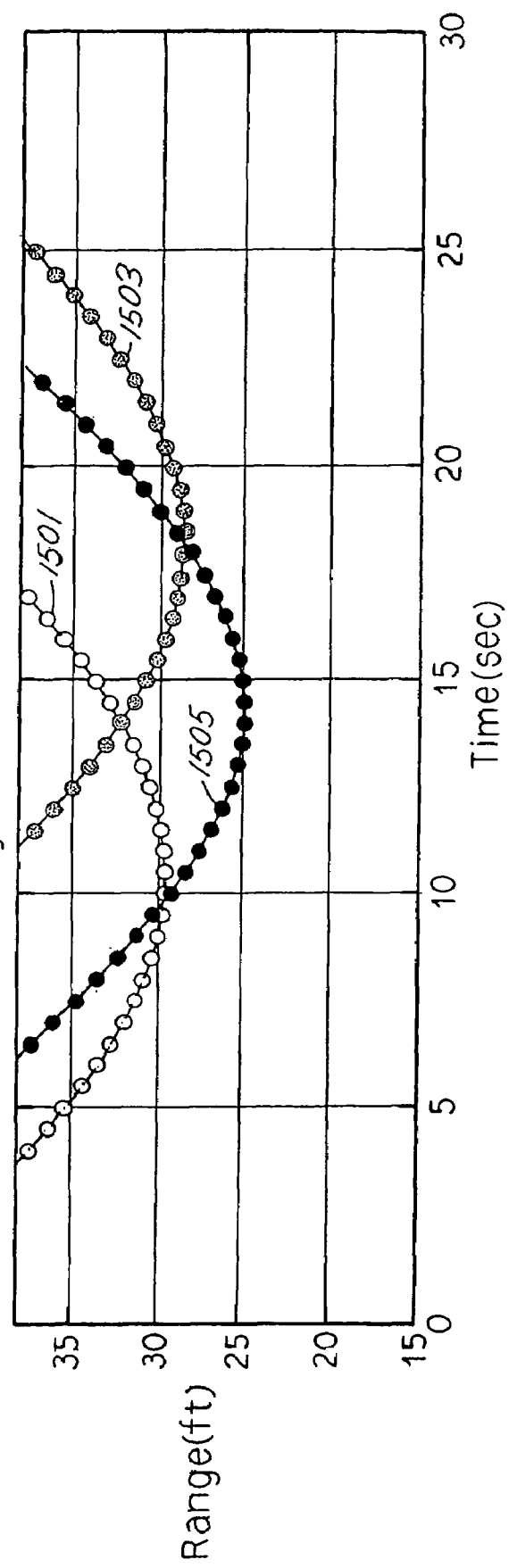
FIG. 15 shows a second example of simulated tracking data.

FIG. 15 shows a second example of a set of simulated tracking data 1500, in which simulated tracking data 1501, 1503, and 1505 are simulated sonar data from adjacent modules 307, 309, and 321 corresponding to a second simulated path.

Figure 16:
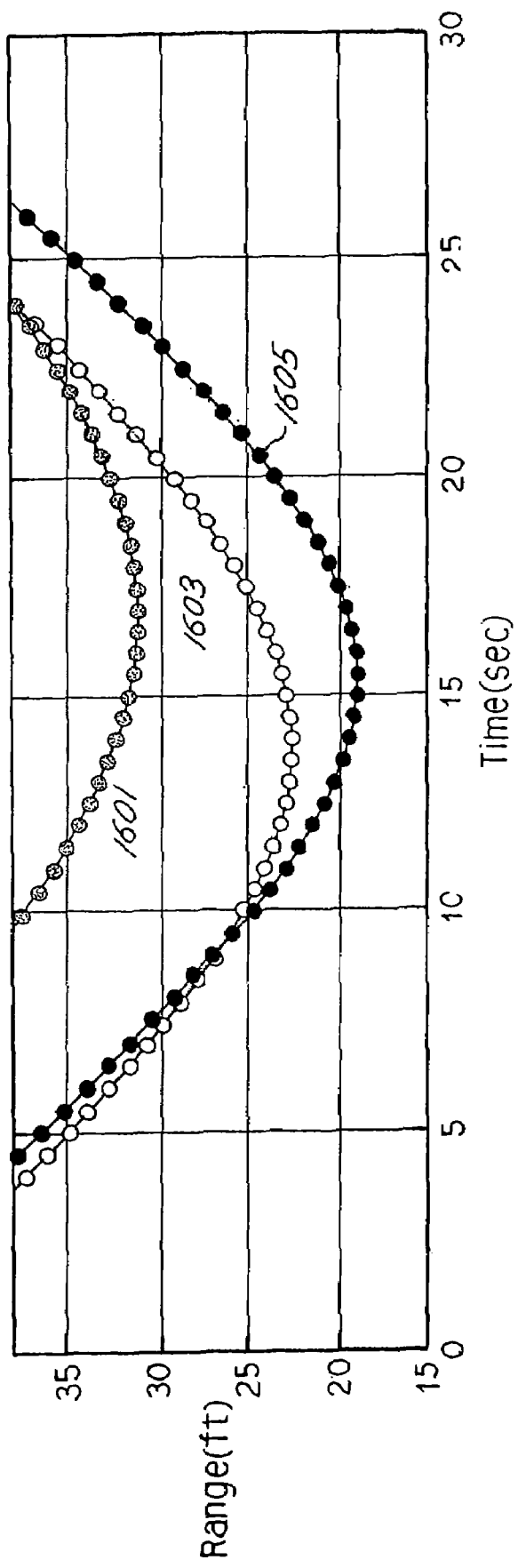
FIG. 16 shows a third example of simulated tracking data.

FIG. 16 shows a third example of a set of simulated tracking data 1600, in which simulated tracking data 1601, 1603, and 1605 are simulated sonar data from adjacent modules 307, 309, and 321 corresponding to a third simulated path. In the embodiment, typically more simulated tracking data, corresponding to different simulated paths, are stored for central processor 319 to access and to compare with tracking data 1300. Central processor 319 may compare selected simulated tracking data to tracking data 1300 and choose a matched simulated tracking data that is "closest" to tracking data 1300. In the embodiment, the matched simulated tracking data has the smallest error when compared with tracking data 1300. Central processor 319 consequently determines the simulated path that is associated with the matched simulated tracking data, which is consequently selected as the estimated path of the target.

For an environment, many simulated tracking data may be stored for comparison. by central processor 319. Moreover, with a variation of the embodiment, sonar system 300 may store simulated tracking data for non-linear paths so that sonar system 300 may discern a target that traverses a non-linear path such as path 805 as shown in FIG. 8. Central processor may utilize target parameter estimations (as determined in step 1207 in FIG. 12, e.g. the target's depth) to reduce the number of memory accesses and to reduce the execution time for determining the matched simulated tracing data.

Figure 17:
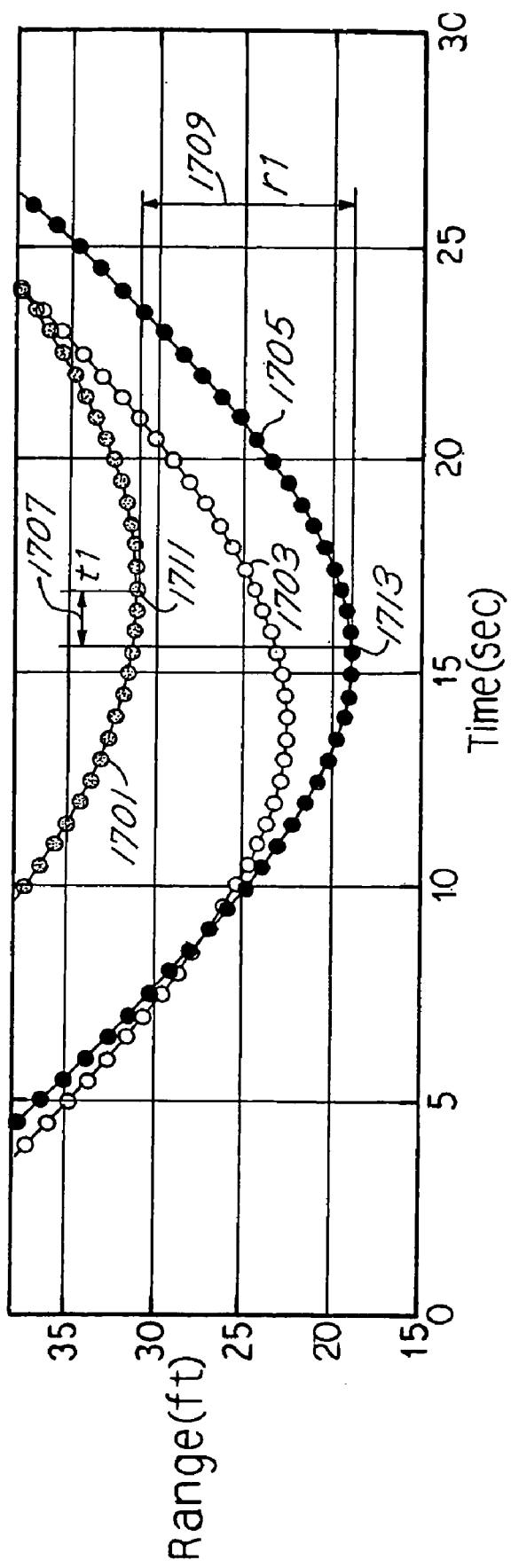
FIG. 17 shows tracking data of a target from adjacent sonar sensor modules.

FIG. 17 shows tracking data 1701, 1703, and 1705 of a target from adjacent sonar sensor modules 307, 309, and 321, respectively. (In the example shown in FIG. 17, tracking data 1700 is the same as tracking data 1300 as shown in FIG. 13.) In FIG. 17, the target has a closest point of approach (CPA) to module 307 corresponding to data point 1711. The target has a closest point of approach to module 321 corresponding to data point 1713. A difference in time 1707 (t1) and a difference in range 1709 (r1) are determined from data points 1711 and 1713. Central processor 319 may also determine corresponding time differences and range differences for the other tracking data (i.e. 1707 and 1703, and 1703 and 1705).

Figure 18:
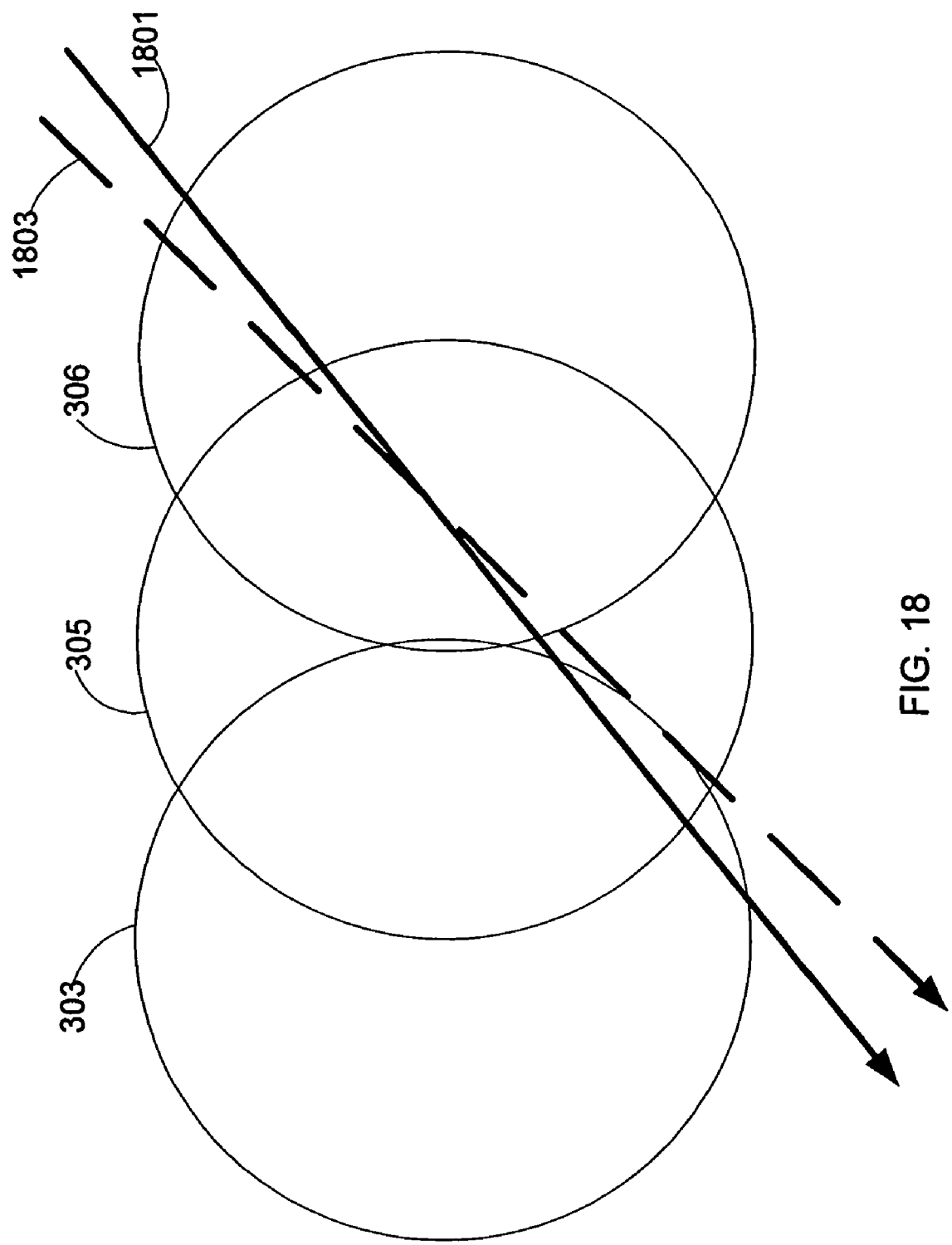
FIG. 18 shows estimated paths of the target corresponding to FIG. 17.

FIG. 18 shows initial estimated path 1801 and final estimated path 1803 of the target corresponding to FIG. 17. Central processor 319 uses the time history of range differences from preferably two or more sonar modules to obtain an initial estimated path 1801. An estimated path corresponds to a set of tracking data that may be compared with tracking data 1700 in order to determine an error measure. The initial estimated path is adjusted in order to reduce the error measure using a multi-parameter search method. In this method, the estimated path is perturbed in each of several parameters related to the path in a sequence based on the greatest slope until a desired minimum error measure is achieved. This procedure results in a "best" estimate of the target's actual path from the sonar data in a relatively time-efficient manner. In summary, it can be said that a "matched-field" approach matches the simulated tracking data with actual tracking data, from which a best guess of a target's path is determined. An "error-function minimization" approach adjusts the estimated path to improve the accuracy and speed of calculation of the path estimate using an efficient search method.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, microcontroller, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A sonar sensor system for determining if a potential underwater intruder passes within a protective boundary, the sonar system comprising:
    a first sonar sensor module comprising:
        a first sonar array that has a first sonar radiation pattern, wherein the first sonar radiation pattern is essentially omni-directional in a first underwater region; and
        a first data collection module that collects first sonar data of a target from the first sonar array;
    a second sonar sensor module comprising:
        a second sonar array that has a second sonar radiation pattern, wherein the second sonar radiation pattern is essentially omni-directional in a second underwater region; and
        a second data collection module that collects second sonar data of the target from the second sonar array; and
    a processor that obtains the first sonar data and that obtains the second sonar data, wherein the processor processes the first sonar data and the second sonar data in order to determine whether the target is deemed to be a threatening underwater intruder.

2. The sonar sensor system of claim 1, wherein the first sonar array is mounted on an entity selected from the group consisting of a pylon of a pier, a surface float, a leg of a water platform, a quay wall, and a water vessel.

3. The sonar sensor system of claim 1, wherein the first sonar array projects from a water bottom to a water surface.

4. The sonar sensor system of claim 1, wherein the first sonar array projects sideways, wherein the first sonar radiation pattern corresponds to a first hemispherical region, and wherein the first sonar radiation pattern is substantially attenuated in an associated oppositely oriented hemispherical region.

5. The sonar sensor system of claim 3, wherein the second sonar array projects sideways, wherein the second sonar radiation pattern corresponds to a second hemispherical region, and wherein the second sonar radiation pattern is substantially attenuated in an oppositely oriented hemispherical region.

6. The sonar sensor system of claim 4, wherein the second sonar array projects sideways, wherein the second sonar radiation pattern corresponds to a second hemispherical region, and wherein the second sonar radiation pattern is substantially attenuated in a corresponding oppositely oriented hemispherical region.

7. The sonar sensor system of claim 3, wherein the second sonar array projects from the water bottom to the water surface.

8. The sonar sensor system of claim 1, wherein the first sonar radiation pattern overlaps the second sonar radiation pattern.

9. The sonar sensor system of claim 8, wherein the first sonar radiation pattern overlaps the second sonar radiation pattern by at least fifty percent.

10. The sonar sensor system of claim 8, wherein a second point is separated from a first point by a distance that is less than a measurement between the water surface and the water bottom.

11. The sonar sensor system of claim 1, wherein the first sonar data comprises a first set of range information about the target and the second sonar data comprises a second set of range information about the target.

12. The sonar sensor system of claim 11, wherein the processor is configured to:
    obtain first tracking data of the target from the first sonar sensor module and second tracking data of the target from the second sonar sensor module, wherein the first tracking data comprises the first set of range information and the second tracking data comprises the second set of range information, and wherein each set of range information is a function of time; and
    calculate an estimated path of the target from the first tracking data and the second tracking data.

13. The sonar sensor system of claim 12, wherein the processor is further configured to:
    determine a first closest point of approach (CPA) from the first tracking data and a second closest point of approach from the second tracking data in order to calculate the estimated path of the target.

14. The sonar sensor system of claim 1, wherein the first sonar sensor module gates off a received sonar signal in order to ameliorate bottom reflection effects.

15. The sonar sensor system of claim 1, wherein the first sonar sensor module varies amplification of a received sonar signal in order to equalize the received sonar signal during a surface reverberation region that follows transmission of a transmitted sonar signal and before a bottom reverberation region.

16. The sonar sensor system of claim 1, further comprising:
    a third sonar sensor module that is situated at a third point in the proximity of the protective boundary.

17. The sonar sensor system of claim 1, wherein the first sonar sensor module comprises a first communications interface that obtains the first sensor data from the data collection module and wherein the second sonar sensor module comprises a second communications interface that obtains the second sensor data from the data collection module, further comprising:
    a telemetry link that interfaces with the first and second communications interfaces.

18. The sonar sensor system of claim 17, wherein the telemetry link utilizes Electronic Industries Association (EJA) and Telecommunications Industry Association (TIA) standard RS-485.

19. The sonar sensor system of claim 17, wherein the telemetry link utilizes Ethernet.

20. The sonar sensor system of claim 17, wherein the telemetry link utilizes an Internet Protocol (IP) in conjunction with a Transmission Control Protocol (TCP).

21. The sonar sensor system of claim 17, wherein the telemetry link comprises a first telemetry bus and a second telemetry bus from an opposite direction so that communications between the processor and the sonar sensor modules can continue if a cable between sensors containing the telemetry busses is cut, or if one of the telemetry busses becomes non-functional.

22. The sonar sensor system of claim 1, wherein the protective boundary is in close proximity to an asset selected from the group consisting of a power plant, an oil drilling rig, a river dam, a bridge, a military ship, a commercial ship, military asset near water, and a commercial asset near water.

23. The sonar sensor system of claim 1, wherein the first sonar sensor module and the second sonar sensor module are sequenced in order to limit interference to a level that does not cause a false detection of the target.

24. The sonar sensor system of claim 1, wherein the first sonar sensor module and the second sonar sensor module are configured at different frequencies in order to limit interference to a level that does not cause a false detection of the target.

25. A method for determining if a target passes within a protective boundary, the method comprising:
 (a) obtaining first sonar data about the target from a first sonar sensor module and second sonar data about the target from a second sonar sensor module, wherein the first sonar sensor module utilizes a first omni-directional pattern in a first underwater region about the first sonar module and the second sonar sensor module utilizes a second omni-directional radiation pattern in a second underwater region about the sonar second sonar module, and wherein the first sonar data comprises first tracking data and the second sonar data comprises second tracking data;
 (b) estimating, from the first tracking data and the second tracking data, at least one characteristic that is associated with a path of the target; and
 (c) calculating an estimated path of the target, wherein a portion of the estimated path is under the protective boundary.

26. The method of claim 25, further comprising:
 (d) calculating a predicted track of the target.

27. The method of claim 26, further comprising:
 (e) providing the predicted track to a user.

28. The method of claim 25, further comprising:
 (d) calculating a threat level estimate to determine if the target is deemed to be a threatening underwater intruder.

29. The method of claim 28, further comprising:
 (e) generating at least one alarm in accordance with the threat level estimate.

30. The method of claim 28, wherein the threat level estimate is selected from a group consisting of a course direction of the target, a target motion threat score, a target echo width, a target echo amplitude, and other potential criteria that may be available from the sonar signals.

31. The method of claim 25, wherein the at least one characteristic comprises a first closest point of approach from the first sonar sensor module with a first associated time and a second closest point of approach from the second sonar sensor module with a second associated time.

32. The method of claim 31, wherein the first associated time and the second associated time are approximately equal.

33. The method of claim 25, wherein (c) comprises:
 (i) fetching a simulated set of tracking data;
 (ii) comparing the simulated set of tracking data with the first tracking data and the second tracking data; and
 (iii) if the simulated set of tracking data sufficiently matches the first tracking data and the second tracking data, determining a corresponding simulated path of the target, wherein the corresponding simulated path approximates an actual path of the target.

34. The method of claim 33, further comprising:
 (iv) if the simulated set of tracking data does not sufficiently match the first tracking data and the second tracking data, repeating (i), (ii), and (iii).

35. The method of claim 25, wherein (c) comprises:
 (i) determining an initial estimated path; and
 (ii) calculating a final estimated path by reducing an error measure with respect to the first tracking data and the second tracking data and a predicted set of tracking data, wherein the predicted set of tracking data is associated with the final estimated path.

36. The method of claim 35, wherein (i) comprises:
 (1) from the first tracking data, determining a first time and a first range that are associated with a first closest point of approach (CPA);
 (2) from the second tracking data, determining a second time and a second range that are associated with a second closest point of approach;
 (3) subtracting the first time from the second time to obtain a time difference;
 (4) subtracting the first range from the second range to obtain a range difference; and
 (5) calculating the initial estimated path by utilizing the time difference and the range difference.

37. The method of claim 35, further comprising:
 (iii) repeating (i) and (ii) until the error measure is sufficiently small.

38. The method of claim 25, further comprising:
 (d) obtaining a third sonar data about the target from a third sonar sensor module, wherein the third sonar sensor module utilizes an omni-directional radiation pattern, and wherein the third sonar data comprises a third tracking data.

39. The method of claim 28, wherein the first sonar data comprises first width data of the target, wherein the second sonar data comprises second width data, and wherein (d) comprises:
 (i) comparing measured width data with expected width data, wherein the measured width data comprises the first and second width data and wherein the expected width data characterizes potential underwater intruders;
 (ii) if a difference between the expected width and the measured width data is sufficiently small, deducing that the target is a possible underwater intruder.

40. The method of claim 28, wherein the first sonar data comprises a first amplitude data of the target, wherein the second sonar data comprises a second amplitude data of the target, and wherein (d) comprises:
 (i) comparing measured amplitude data with expected amplitude data in relation to a range of the target, wherein the measured amplitude data comprises the first and second amplitude data and wherein the expected amplitude data characterizes potential underwater intruders;
 (ii) if a difference between the expected amplitude and the measured amplitude data is sufficiently small, deducing that the target is a possible underwater intruder.

41. The method of claim 25, wherein the at least one characteristic comprises a velocity estimate of the target, wherein the velocity comprises a direction and a speed of the target.

42. A computer-readable medium having computer-executable instructions for performing the method recited in claim 25.

43. A computer-readable medium having computer-executable instructions for performing the method recited in claim 28.

44. A computer-readable medium having computer-executable instructions for performing the method recited in claim 33.

45. A computer-readable medium having computer-executable instructions for performing the method recited in claim 35.

46. A sonar sensor system for determining if an underwater intruder passes under a protective boundary by a ship, the sonar system comprising:
- a first sonar sensor module comprising:
   - a first sonar array that has a first sonar radiation pattern that covers a vertical direction from a water bottom to a water surface, wherein the first sonar radiation pattern is essentially omni-directional;
   - a first data collection module that collects first sonar data of a target from the first sonar array; and
   - a first communications interface that obtains the first sonar data from the data collection module;
- a second sonar sensor module comprising:
   - a second sonar array that has a second sonar radiation pattern that covers a vertical direction from the water bottom to the water surface, wherein the second sonar radiation pattern is essentially omni-directional;
   - a second data collection module that collects second sonar data of the target from the second sonar array; and
   - a second communications interface that obtains the second sonar data from the data collection module;
- a telemetry link that interfaces with the first and second communications interfaces; and
- a processor that communicates with the first communications interface in order to obtain the first sonar data and that communicates with the second communications interface in order to obtain the second sonar data through the telemetry link, wherein the processor processes the first sonar data and the second sonar data in order to determine whether the target is the underwater intruder, and wherein the processor is configured to:
   - obtain a first tracking data of the target from the first sonar sensor module and a second tracking data of the target from the second sonar sensor module, wherein each tracking data comprises a set of range information about the target, and wherein each set of range information is a function of time;
   - fetch a simulated set of tracking data;
   - compare the simulated set of tracking data with the first tracking data and the second tracking data; and
   - if the simulated set of tracking data sufficiently matches the first tracking data and the second tracking data, approximate a path of the target with a corresponding simulated path of the target.

47. The sonar sensor system of claim 6, wherein the second hemispherical region is angularly offset from the first hemispherical region.

48. The sonar sensor system of claim 17, wherein the telemetry link comprises a telemetry bus and a plurality of repeaters, wherein each repeater senses a direction of arrival of a data message and continues to send the data message in the direction of arrival, and wherein, if a cut occurs in the telemetry bus, a first repeater on one side of the cut and a second repeater on another side of the cut isolate the cut so that the data message is transported on an appropriate half of the telemetry bus.

49. The sonar sensor system of claim 1, wherein the first sonar sensor module processes a received sonar signal based on a historical variation of a received amplitude.

50. The sonar sensor system of claim 49, wherein the first sonar sensor module determines whether the received sonar signal deviates sufficiently from the historical variation of the received amplitude.

* * * * *